United States Patent [19]
Yoshimura

[11] Patent Number: 5,377,061
[45] Date of Patent: Dec. 27, 1994

[54] TAPE CASSETTE LOADING APPARATUS

[75] Inventor: Toshio Yoshimura, Kawasaki, Japan

[73] Assignee: Tanashin Denki Co., Ltd., Tokyo, Japan

[21] Appl. No.: 903,153

[22] Filed: Jun. 24, 1992

[30] Foreign Application Priority Data

Jun. 26, 1991 [JP] Japan .................................. 3-181902

[51] Int. Cl.[5] ..................... G11B 15/675; G11B 5/54
[52] U.S. Cl. ............................. 360/96.5; 360/105
[58] Field of Search ............ 360/93, 96.5, 96.6, 360/96.4, 105

[56] References Cited

U.S. PATENT DOCUMENTS

| | | | |
|---|---|---|---|
| 4,295,169 | 10/1981 | Iwata et al. | 360/96.5 |
| 4,479,155 | 10/1984 | Takai et al. | 360/96.5 |
| 4,568,990 | 2/1986 | Ueno et al. | 360/96.5 |
| 4,723,236 | 2/1988 | Kitami | 360/96.5 |
| 5,105,320 | 4/1992 | Hayashi | 360/96.5 |

FOREIGN PATENT DOCUMENTS 0117752 7/1984 Japan .................................. 360/130.21

Primary Examiner—A. J. Heinz
Assistant Examiner—Brian E. Miller
Attorney, Agent, or Firm—Wegner, Cantor, Mueller & Player

[57] ABSTRACT

A tape cassette loading apparatus wherein various components can operate smoothly at suitable timings with a simple construction. A pivotal lever is pivoted at an initial stage when a tape cassette is inserted into a cassette holder, and a controlling member is moved a little forwardly by the pivotal lever. The movement of the controlling member is detected by a position detector, and a loading motor is controlled in response to a detection signal from the position detector. The controlling member is driven to move forwardly and backwardly by power of the loading motor, and a changing-over operation between loading and unloading of a tape cassette and a mode position changing-over operation of a head mounting plate are performed by the forward and backward movement of the controlling member.

3 Claims, 14 Drawing Sheets

TAPE CASSETTE LOADING APPARATUS

BACKGROUND OF THE INVENTION

1. Field of the Invention

This invention relates to a tape cassette loading apparatus suitable for a logical-control-type car stereo tape recorder, and more particularly to a tape cassette loading apparatus permitting smooth movements of individual components at suitable timings with a simple construction.

2. Description of the Related Art

In recent years, tape recorders of the logical control type have been popular wherein a plurality of manual operation elements for putting the tape recorder into predetermined operation modes and a stop mode are constructed as touch switches and various movable elements of a tape recorder mechanism are moved by power of a motor to respective positions at which an operation or stop mode corresponding to a manually operated one of the manual operation elements is established.

An exemplary one of tape cassette loading apparatus for such tape recorders is disclosed, for example, in Japanese Patent Application Laid-Open (Kokai) No. SHO 61-17248. The tape cassette loading apparatus includes a cam gear connected to be rotated by a motor, and a solenoid serving as changing-over means. The cam gear and the solenoid are controlled so that a changing-over operation between loading and unloading (ejection) of a tape cassette and a changing-over operation of the position of a head mounting plate from one mode to another (selected from play, fast-forward and rewind modes) may be performed alternatively.

The prior art tape cassette loading apparatus, however, is disadvantageous in that it is complicated in construction because the cam gear and the solenoid must be controlled in a mutually associated relationship. Besides, it is difficult to design the associated elements so that they may move in an accurately timed relationship with one another.

SUMMARY OF THE INVENTION

It is an object of the present invention to provide a tape loading apparatus wherein various components can move smoothly at suitable timings with a simple construction.

In order to attain the object, the present invention provides a tape cassette loading apparatus, which comprises:

a controlling member mounted for forward and backward movement and having first and second cams thereon;

a motor for driving said controlling member to move forwardly and backwardly;

a head mounting plate held in engagement with said first cam of said controlling member in such a manner as to be moved forwardly and backwardly between a stop position and a tape-operating position by said first cam in response to forward and backward movement of said controlling member;

a support member mounted for upward and downward pivotal motion;

a cassette holder supported for pivotal motion on said support member and engaging said second cam of said controlling member so as to be moved upwardly and downwardly between a lower, tape-operating position and an upper, tape cassette receiving/ejecting position by said second cam in response to said controlling member;

a slider for engaging the tape cassette received in said cassette holder so as to associated in movement with insertion or ejection of the tape cassette into or from the cassette holder, said slider being arranged movably back and forth on the support member;

a pivotal lever associated with said controlling member when said cassette holder is in the upper, tape cassette receiving/ejecting position, said pivoted lever being normally associated with said slider;

a position detector for detecting the placement of said controlling member at a predetermined position; and motor controlling means for controlling said motor in response to an output from said position detector;

wherein movement of the tape cassette in the receiving/ejecting direction in or from said cassette holder, upward and downward movement of said cassette holder and forward and movement of said head mounting plate are performed in a predetermined timed relationship by forward and backward movement of said controlling member.

In the tape cassette loading apparatus, the pivotal lever is pivoted in response to an initial inserting operation of a tape cassette into the cassette holder, and the controlling member is moved forwardly a little in response to such pivotal motion of the pivotal lever. The forward movement of the controlling member is detected by the position detector, and the motor controlling means produces a controlling signal in response to a detection signal received from the position detector then. In response to the controlling signal, the motor is rotated, and the controlling member is moved forwardly and backwardly by power of the motor. A changing-over operation between loading and unloading of the tape cassette and a mode-depending, changing-over operation of the position of the head mounting plate are performed at the respective predetermined timings by the forward and backward movements of the controlling member. Thus, with the tape cassette loading apparatus, the various components can move smoothly at suitable timings with a simple construction.

To move the cassette holder down to the tape-operating position, the controlling member is moved in a preferably in a direction in which the tape cassette is ejected from the cassette holder. Because, if an electric circuit of the tape cassette loading apparatus should fail, the controlling member may be pushed in by manual operation to eject the tape cassette.

Preferably, the controlling member has a pressing inclined face which produces a face component for downwardly pressing the cassette holder after the controlling member has moved forward or backward to downwardly move the cassette holder to the tape-operating position, the cassette holder moved down to its tape-operating position is pressed downwardly. The cassette holder can thus be held stably at its tape-operating position.

The above and other objects, features and advantages of the present invention will become apparent from the following description and the appended claims, taken in conjunction with the accompanying drawings in which like parts are denoted by like reference characters all through the drawings.

BRIEF DESCRIPTION OF THE DRAWINGS

FIG. 8 is a side view of the tape cassette loading apparatus after a tape cassette has been fully drawn in;

DESCRIPTION OF THE PREFERRED EMBODIMENT

Figure 1:
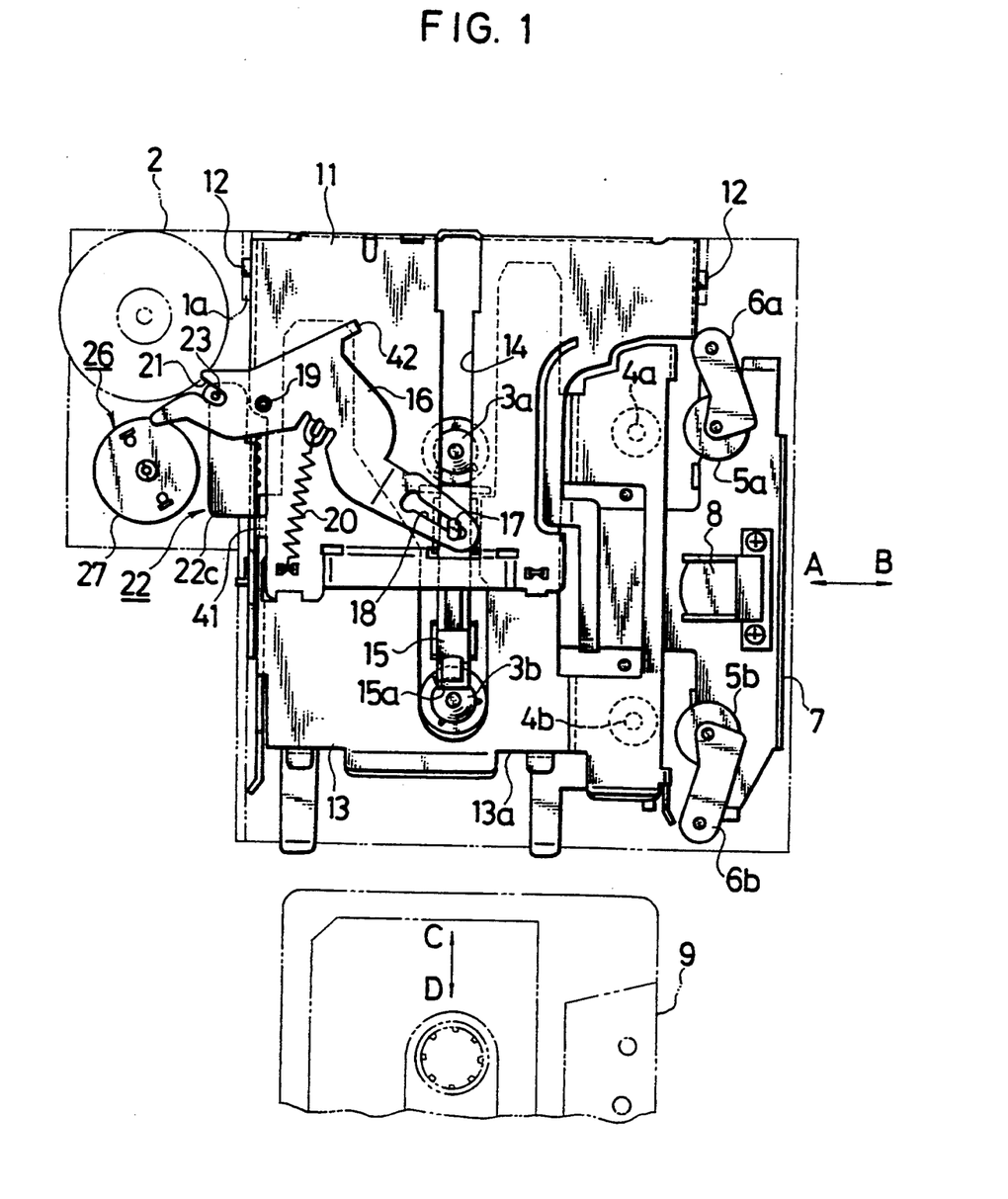
FIG. 1 is a plan view of a tape recorder in a stop mode in which a tape cassette loading apparatus according one embodiment of the present invention is incorporated.
Figure 2:
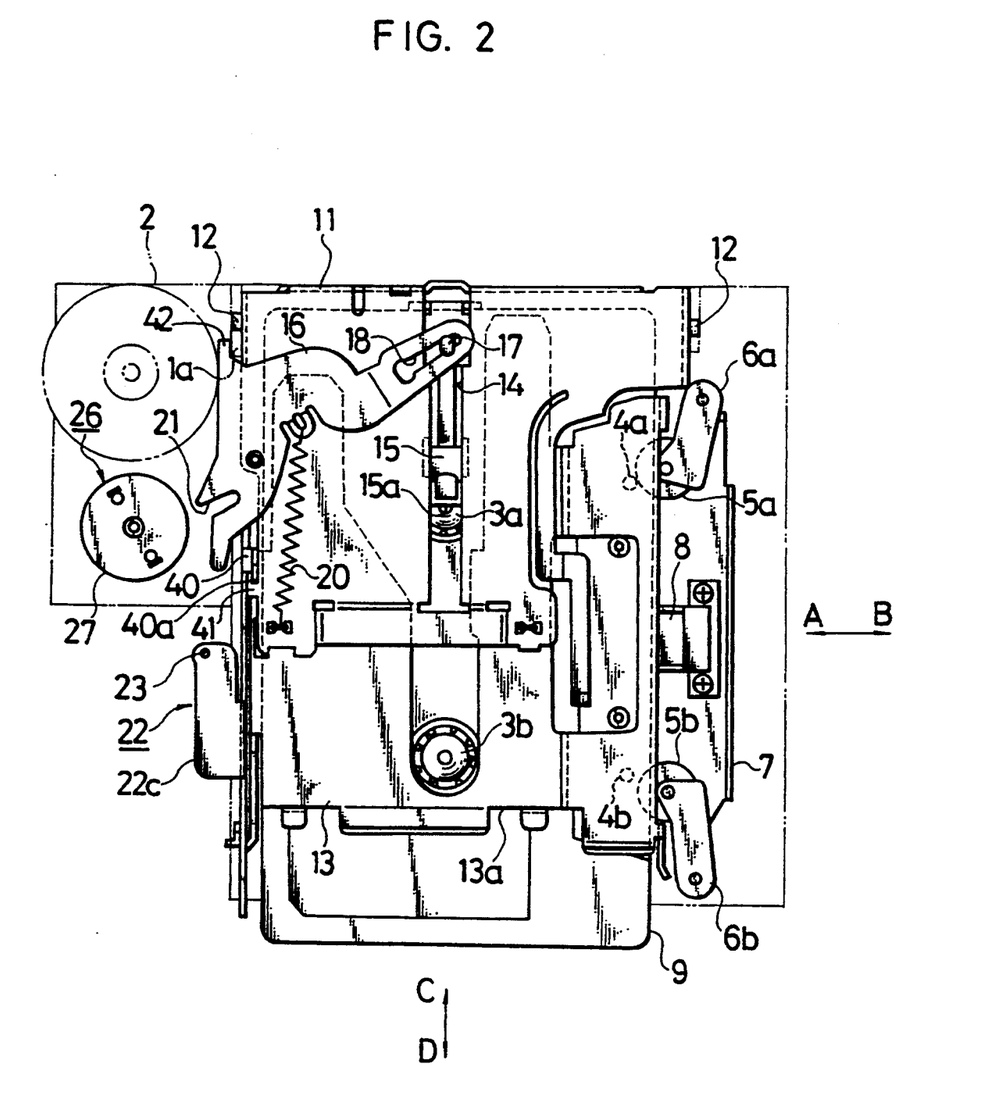
FIG. 2 is a plan view of the tape recorder in a play mode.

Referring first to FIGS. 1 and 2, there is shown a tape recorder in which a tape cassette loading apparatus according to the present invention is incorporated. The tape recorder shown includes a chassis 1. A tape feeding motor 2, a pair of reel spindles 3a and 3b, a pair of capstans 4a and 4b and a pair of pinch rollers 5a and 5b are disposed on an upper face of the chassis 1.

The reel spindles 3a and 3b and the capstans 4a and 4b are driven to rotate by the tape feeding motor 2. The pinch rollers 5a and 5b are supported for rotation on a pair of pinch roller arms 6a and 6b, respectively, which are connected to a head mounting plate 7 mounted for back forth movement in the directions indicated by arrow marks A and B on the upper face of the chassis 1.

When the head mounting plate 7 is its home or stopping position, the pinch rollers 5a and 5b remain spaced away from the capstans 4a and 4b, respectively, as seen from FIG. 1. When the head mounting plate 7 is moved forwardly in the direction of the arrow mark A to its play position, the pinch roller 5a or 5b is selectively contacted with the corresponding capstan 4a or 4b as seen in FIG. 2.

Figure 4:
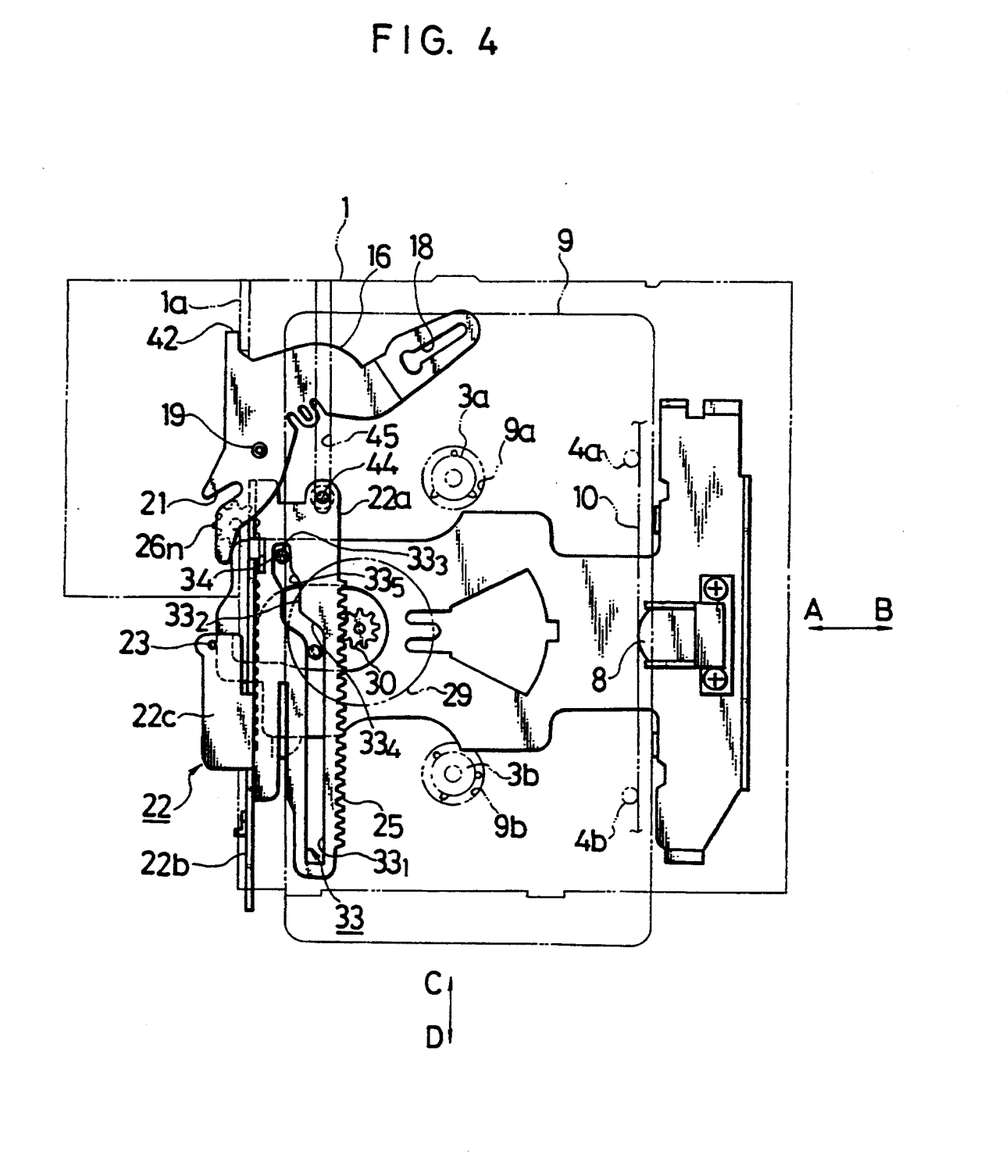
FIG. 4 is similar to FIG. 3 but shows the tape recorder in the play mode.

A magnetic head 8 is mounted on the upper face of the head mounting plate 7. When the head mounting plate 7 is at its play position shown in FIG. 2, the magnetic head 8 contacts with a tape 10 in a tape cassette 9 as seen in FIG. 4.

A support member 11 is mounted for pivotal motion in upward and downward directions around a pivot 12 above the chassis 1 (also referred to FIGS. 7 to 10). A cassette holder 13 is mounted for pivotal motion below the support member 11. The cassette holder 13 has a tape cassette insertion opening 13a formed at an end thereof. Thus, a tape cassette 9 is removably inserted in a direction perpendicular to the direction of movement of the head mounting plate 7, that is, in the direction indicated by an arrow mark C or D in FIG. 1 or 2 into the cassette holder 13 through the tape cassette insertion opening 13a.

Figure 9:
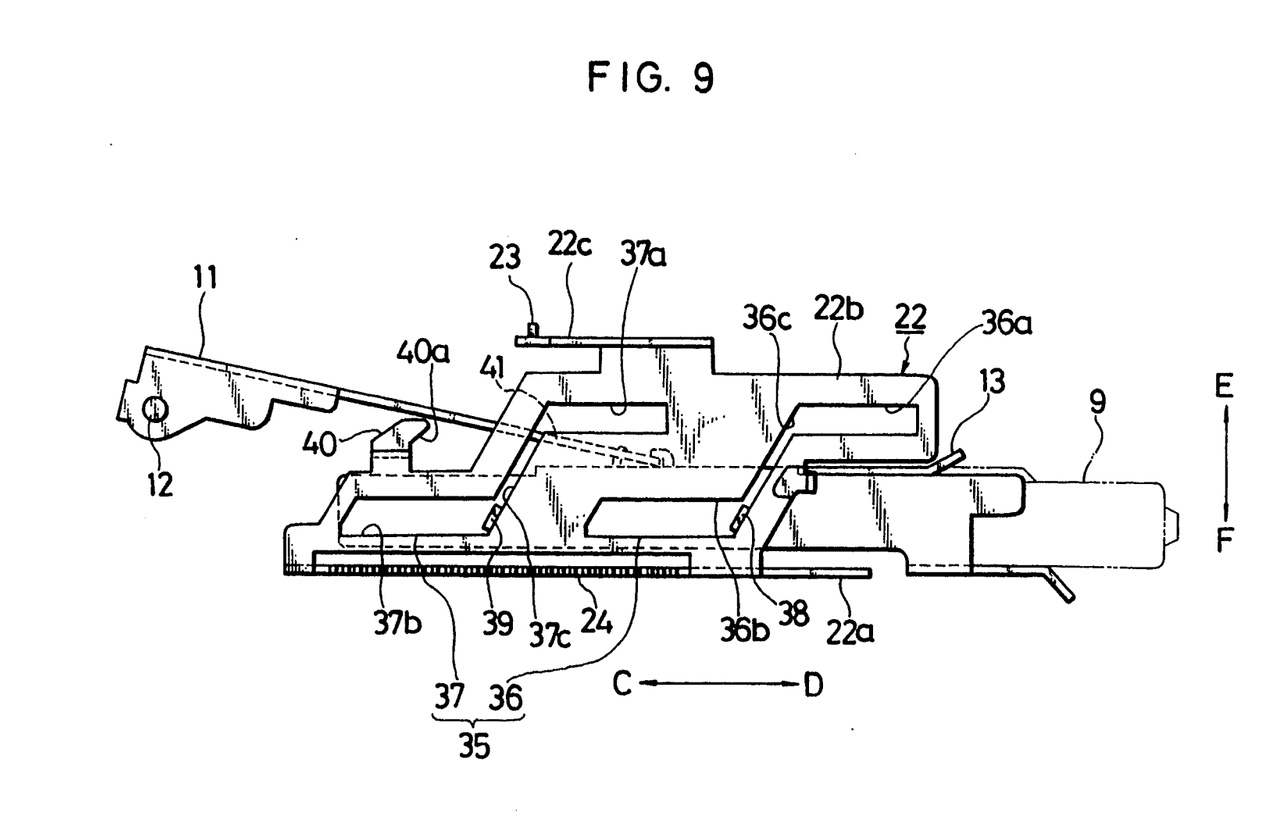
FIG. 9 is a side view of the tape cassette loading apparatus after a cassette holder has been moved down.
Figure 10:
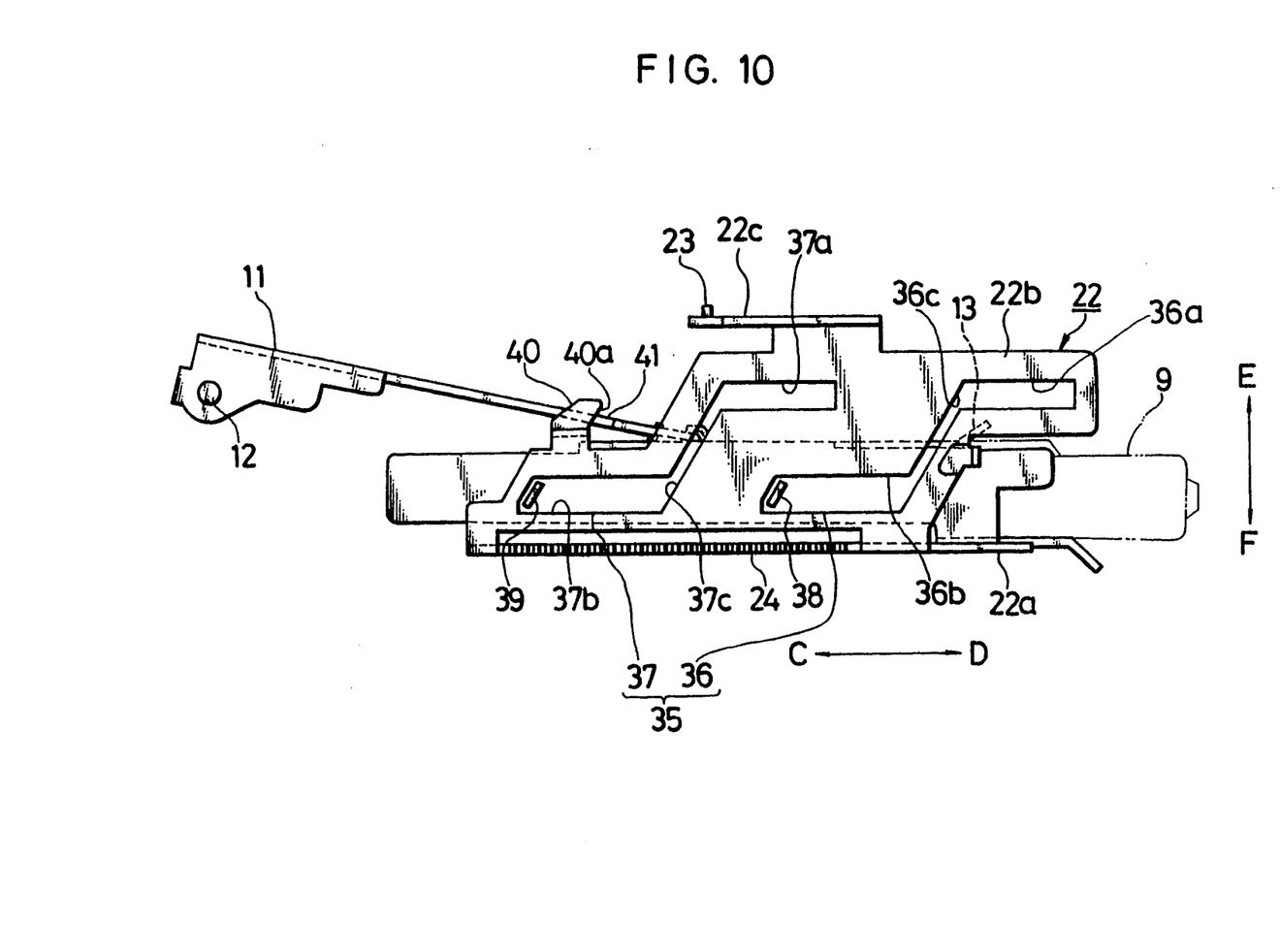
FIG. 10 is a side view of the tape cassette loading apparatus in the play mode.
Figure 11:
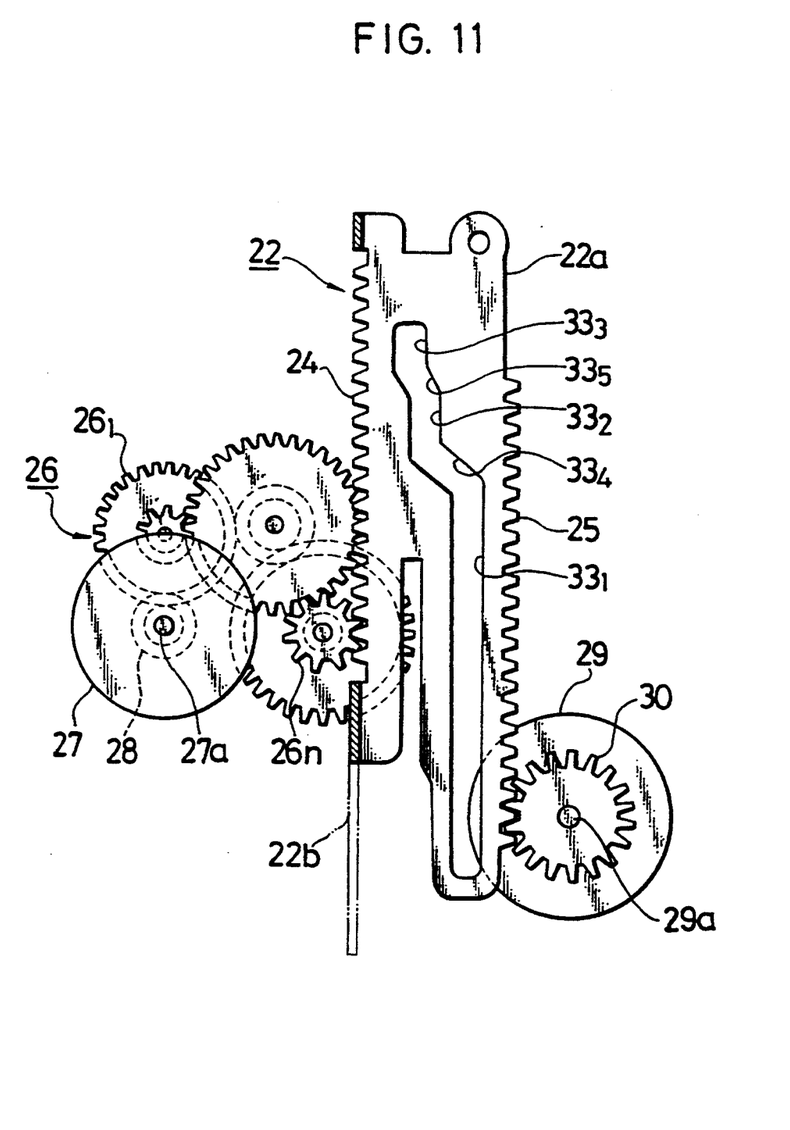
FIG. 11 is a plan view of a controlling member and associated gears in the tape cassette loading apparatus.
Figure 12:
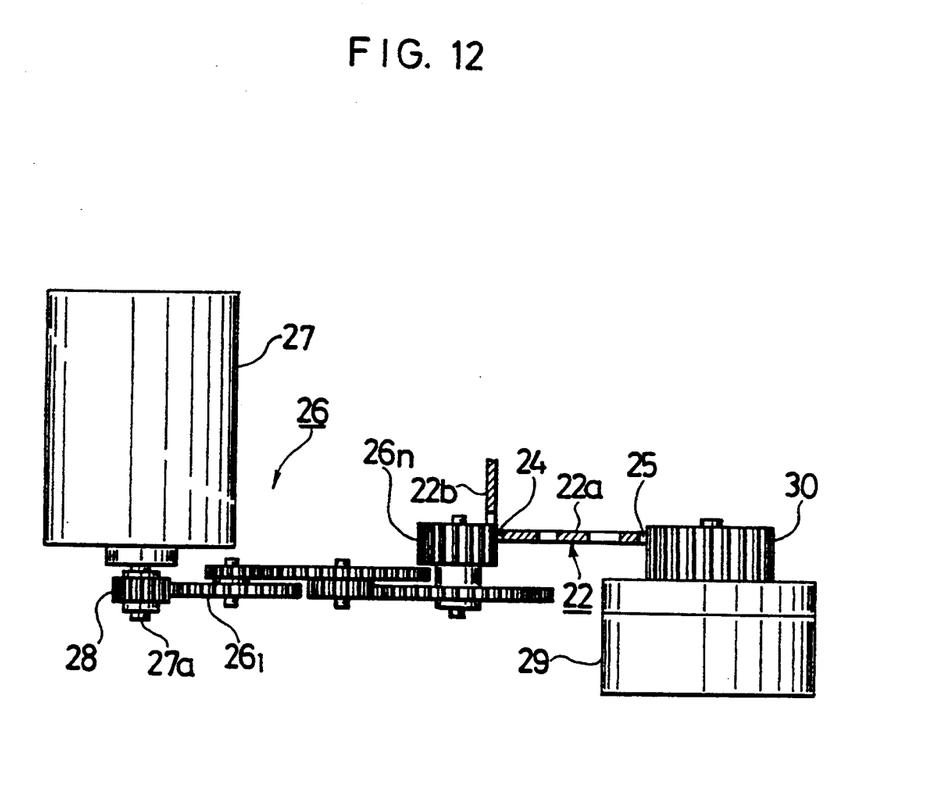
FIG. 12 is a partly-sectional side view of the controlling member, the associated gears and a motor in the tape cassette loading apparatus.

When the support member 11 is pivoted downwardly together with the cassette holder 13 while a tape cassette 7 is received in position in the cassette holder 13, the tape cassette 9 is loaded to its play position with reels 9a and 9b thereof engaged with the reel spindles 3a and 3b, respectively, as seen in FIGS. 2, 9 and 10.

A slider 15 is mounted for engagement with a guide slot 14 formed substantially at the center of the support member 11 such that the slider 15 may move in a same direction as the direction of insertion or removal of a tape cassette 9 into or from the cassette holder 13, that is, in the direction of the arrow mark C or D (refer to FIGS. 1 and 2). An engaging portion (not shown) provided at an end portion 15a of the slider 15 is disengageably engaged with an edge portion of the reel 9a of the tape cassette 9 so that the tape cassette 9 is moved in the direction of the arrow mark C or D together with the slider 15 in the cassette holder 13.

The slider 15 is connected to an end of a pivotal lever 16 by a pin-and-slot connection. In particular, the pin-and-slot connection includes a connecting pin 17 provided on an upper face of the slider 15 and an elongated slot 18 formed at an end of the pivotal lever 16 and fitted for sliding movement with the connecting pin 17.

The pivotal lever 16 is mounted for pivotal motion on an upper face of the support member 11 by means of a pivot 19. A coil spring 20 having comparatively small biasing force extends between the pivotal lever 16 and the support member 11. Thus, the slider 15 is normally biased in the direction of the arrow mark D by the spring 20 by way of the pivotal lever 16 so that the engaging portion of the end portion 15a is engaged with certainty with the reel 9a of the tape cassette 9. An engaging recess 21 is formed at the other end portion of the pivotal lever 16. An engaging pin 23 is provided on a controlling member 22 and disengageably engaged with the engaging recess 21.

Figure 6:
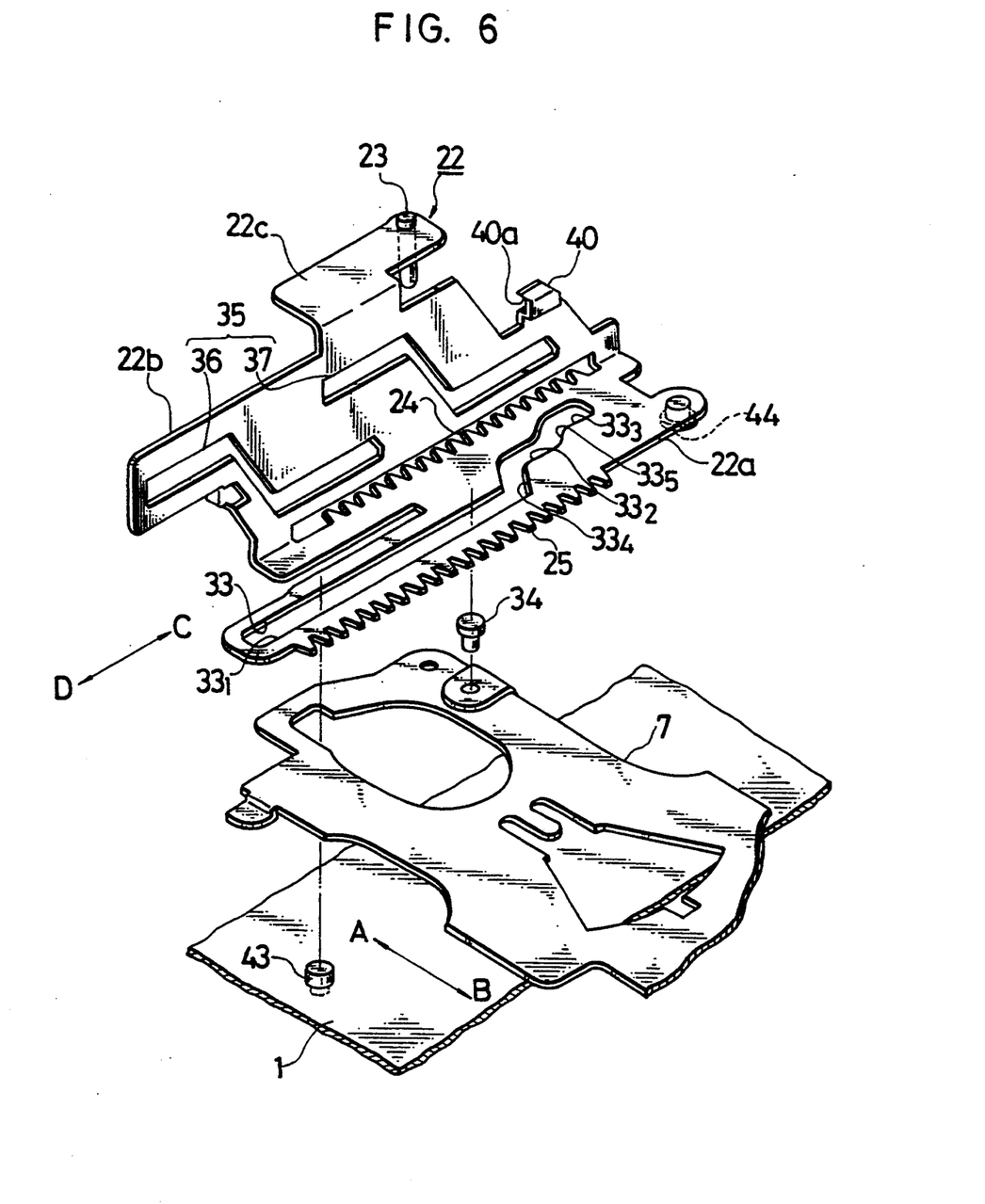
FIG. 6 is an exploded fragmentary perspective view of the tape cassette loading apparatus.

The controlling member 22 is mounted on the upper face of a side portion of the chassis 1 for back and forth movement in a direction perpendicular to the direction of movement of the head mounting plate 7, that is, in the direction of the arrow mark C or D, such that it is positioned above the head mounting panel 7. The controlling member 22 has a chassis 22a and a side plate 22b extending perpendicularly upwardly from a side edge of the base plate 22a and has a generally L-shaped section as seen in FIG. 6. Racks 24 and 25 are formed along the opposite side edges of the base plate 22a of the controlling member 22.

Referring now to FIGS. 1 to 5 and 11 to 13, a final stage gear, i.e., pinion 26n of a reduction gear train 26 is held in meshing engagement with the rack 24. A first stage gear 26₁ of the reduction gear train 26 is held in meshing engagement with a drive gear 28 securely mounted on a drive shaft 27a of a bidirectional loading motor 27.

Turning force of the loading motor 27 is transmitted to the controlling member 22 by way of the drive gear 28, the reduction gear train 26 and the rack 24 so that the controlling member 22 is moved forwardly and backwardly in the directions of the arrow marks C and D. The reduction gear train 26 and the loading motor 27 are disposed on the upper face of a side portion of the chassis 1.

A gear 30 is held in meshing engagement with the rack 25 on the other side edge of the base plate 22a of the controlling member 22. The gear 30 is securely mounted on a rotary shaft 29a of a position detector 29 which may be constituted from a rotary encoder. When the controlling member 22 has moved by a predetermined distance in the direction of the arrow mark D from its initial position, this is detected by the position detector 29, and a detection signal is delivered from the position detector 29. A motor controller which will be hereinafter described delivers, in response to the detection signal, a controlling signal to control rotation of the loading motor 27.

Figure 13:
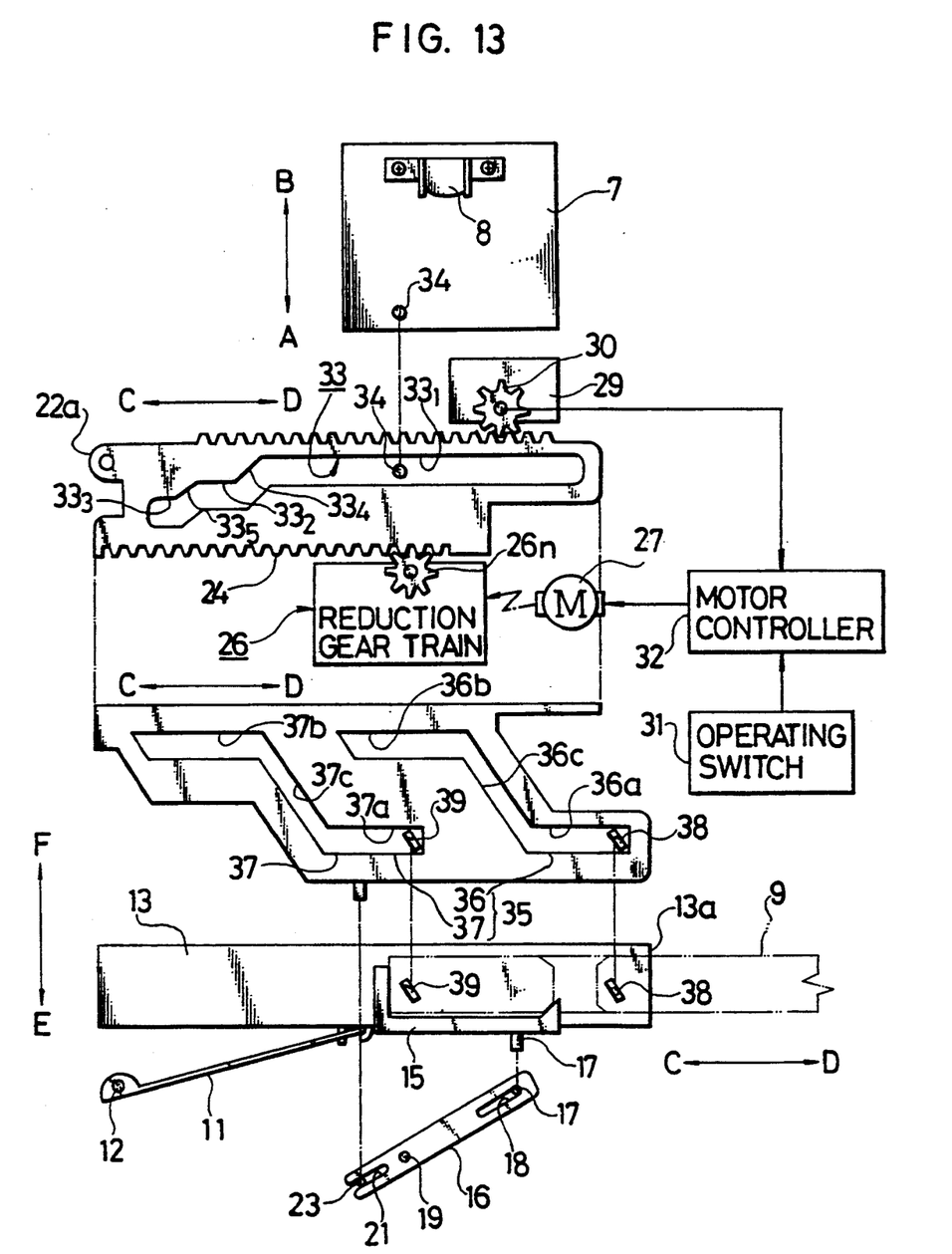
FIG. 13 is a block diagram illustrating mutually-associated movements of individual elements in the tape cassette loading apparatus.

Referring to FIG. 13, a position detection signal from the position detector 29 and an operation signal from an operating switch 31 for setting any of stopping, playing, and fast feed or rewind modes of the tape recorder are inputted to a motor controller 32 which may be constituted from a microcomputer. The motor controller 32 outputs, in response to those input signals, a controlling signal to control energization of the loading motor 27.

Referring now to FIGS. 3 to 6, 11, 13 and 14, a first cam 33 in the form of a guideway serving as a positive motion cam slot is formed on the base plate 22a of the controlling member 22. The first cam 33 includes first, second and third straight portions $33_1$, $33_2$ and $33_3$ extending in parallel to the direction of movement of the controlling member 22 and displaced from each other in a direction perpendicular to the direction of movement, a first inclined portion $33_4$ interconnecting the first and second straight portions $33_1$ and $33_2$, and a second inclined portion $33_5$ interconnecting the second and third straight portions $33_2$ and $33_3$. A cam pin 34 is normally held in engagement with the first cam 33. The cam pin 34 is provided on the upper face of the head mounting plate 7.

Figure 3:
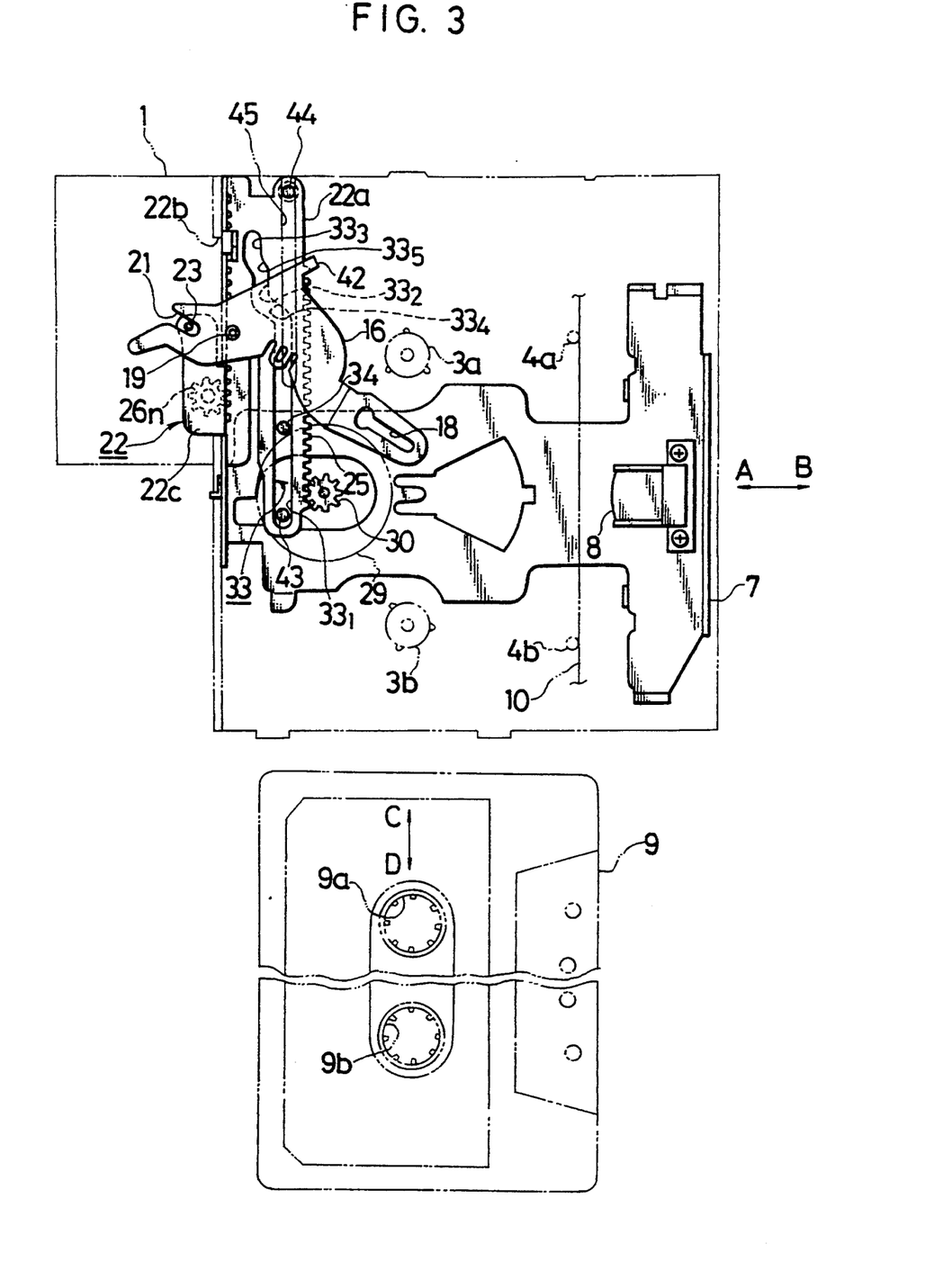
FIG. 3 is a plan view of the tape recorder in the stop mode without a support member, a cassette holder and slider.

When the cam pin 34 is positioned in the first straight portion $33_1$ of the first cam 33, the head mounting plate 7 assumes its stopping or home position shown in FIG. 3. When the cam pin 34 is positioned in the second straight portion $33_2$ of the first cam 33, the first cam 33, the head mounting plate 7 assumes its feed or rewind position shown in FIG. 5. When the cam pin 34 is positioned in the third straight portion $33_3$ of the first cam 33, the head mounting plate assumes its play position shown in FIG. 4.

A tab 22c, which has an L-shaped cross-section as viewed at a right angle to the length of the controlling member 22, extends horizontally outwardly from a substantially mid portion of an upper end edge of the side plate 22b of the controlling member 22, and the engaging pin 23 described hereinabove is provided on an upper face of the tab 22c. When the engaging pin 23 is in engagement with the engaging recess 21 of the pivotal lever 16, the pivotal lever 16 is operatively coupled to the controlling member 22. On the other hand, when the engaging pin 23 is out of engagement with the engaging recess 21 of the pivotal lever 16, the controlling member 22 moves by itself.

A second cam 35 is formed in the side plate 22b of the controlling member 22. The second cam 35 is composed of a pair of cam slots 36 and 37 formed in the side plate 22b in a spaced relationship from each other in the direction of movement of the controlling member 22.

The front side cam slot 36 is composed of a pair of upper and lower horizontal portions 36a and 36b and an inclined portion 36c interconnecting the upper and lower horizontal portions 36a and 36b. Meanwhile, the rear side cam slot 37 is composed of a pair of upper and lower horizontal portions 37a and 37b and an inclined portion 37c interconnecting the upper and lower horizontal portions 37a and 37b.

A pair of engaging projections 38 and 39 are provided on a side face of the cassette holder 13 and normally held in engagement for relative motion with the front and rear side cam slots 36 and 37, respectively, of the second cam 35 of the controlling member 22 (refer to FIGS. 7 to 10 and 13).

Figure 7:
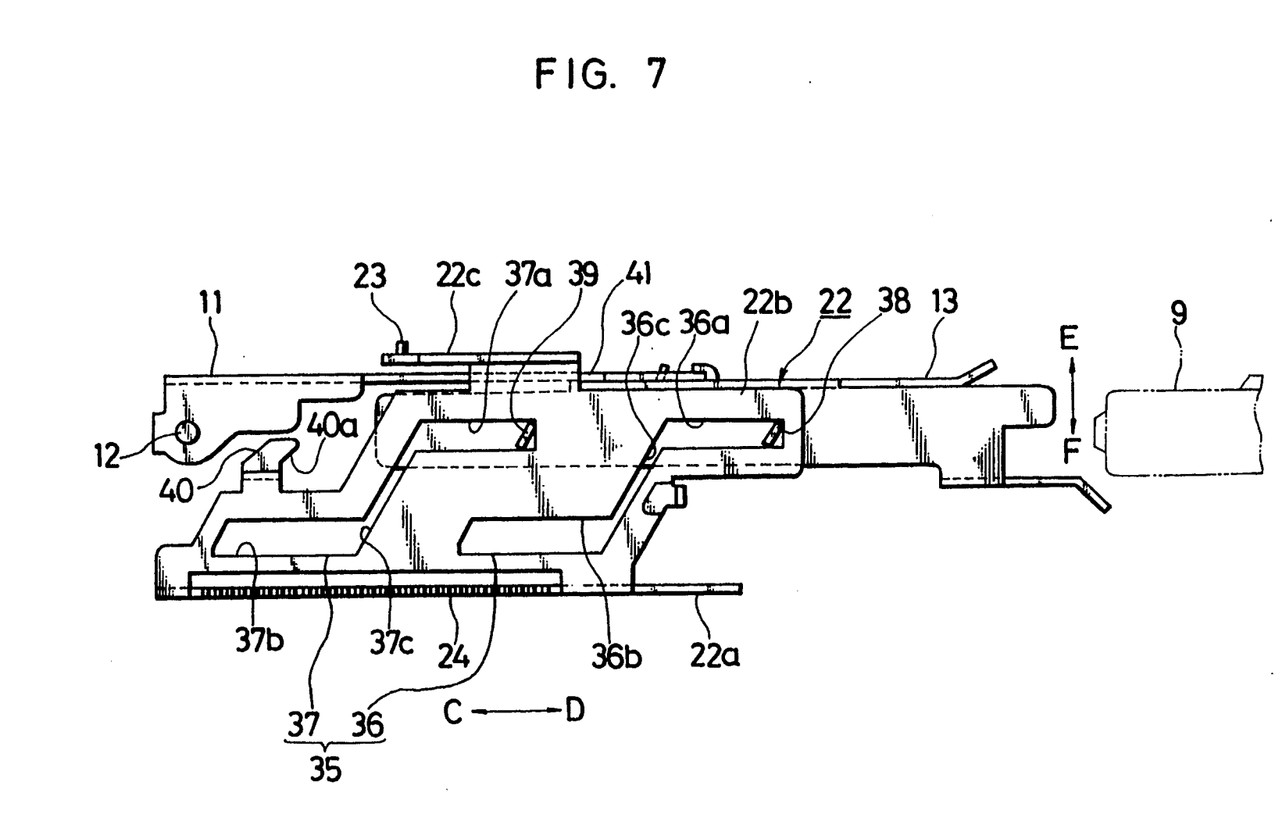
FIG. 7 is a side view of the tape cassette loading apparatus in a stop mode.
Figure 8:
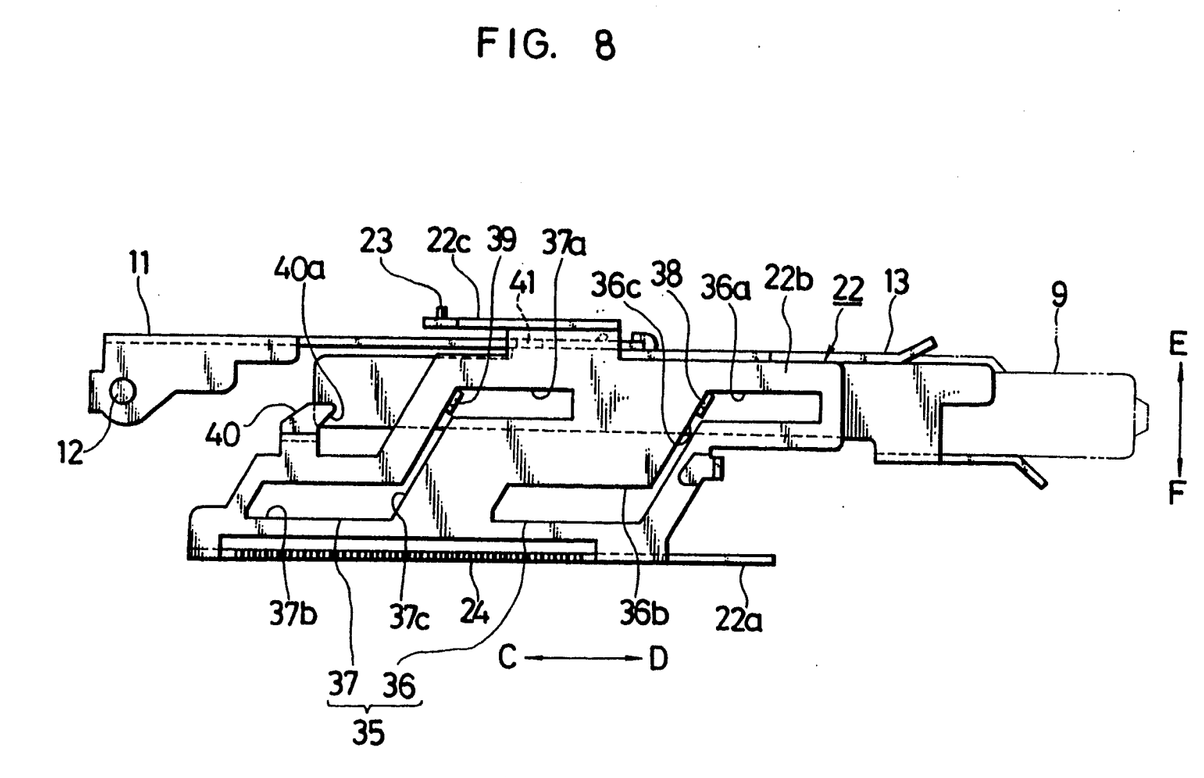

So far as the engaging projections 38 and 39 remain in engagement with the upper side horizontal portions 36a and 37a of the front and rear side guide slots 36 and 37, respectively, the support member 11 is held at its upwardly pivoted position and the cassette holder 13 is held at its upwardly moved position as seen in FIGS. 7 and 8.

When the controlling member 22 moves forwardly in the direction of the arrow mark D, engaging projections 38 and 39 are moved away from the upper side horizontal portions and introduced into the inclined portions 36c and 37c of the front and rear side cam slots 36 and 37, respectively. Thereupon, the support member 11 is pivoted downwardly around the pivot 12 and the cassette holder 13 is moved downwardly in the direction indicated by an arrow mark F while maintaining the horizontal position (refer to FIGS. 9 and 10).

On the other hand, when the controlling member 22 moves backwardly in the direction of the arrow mare C, the engaging projections 38 and 39 are moved away from the inclined portions 36c and 37c and introduced into the upper side horizontal portions 36a and 37a of the front and rear side cam slots 36 and 37, respectively. Thereupon, the support member 11 is pivoted upwardly around the pivot 12 and the cassette holder 13 is moved upwardly in the direction indicated by an arrow mark E while maintaining its horizontal position.

A pressing projection 40 is provided on the upper face of a rear end portion of the controlling member 22. The pressing projection 40 has an inclined face 40a at a side edge thereof. When the controlling member 22 moves forwardly in the direction of the arrow mark D to its play position, the inclined face 40a of the pressing projection 40 presses against a protrusion 41 provided on a side edge of the support member 11 (refer to FIG. 10). Consequently, the cassette holder 13 is pressed against the upper face of the chassis 1 by way of the support member 11.

An engaging lug 42 is provided on the pivotal lever 16 (refer to FIG. 1). When the support member 11 is pivoted downwardly, the engaging lug 42 of the pivotal lever 16 is engaged with and positioned on an outer side face of a side wall la of the base 1. The side wall la thus acts as a stopper to prevent the pivotal lever 16 from pivoting in its returning direction, that is, in the clockwise direction in FIGS. 4 and 5.

A guide projection 43 is provided on the upper face of the chassis 1 and normally held in engagement for sliding movement with the first straight portion $33_1$ of the first cam 33 of the controlling member 22. Another guide projection 44 is provided at a rear end portion of the chassis 22b of controlling member 22 adjacent the third straight portion $33_3$ of the first cam 33. The guide projection 44 is in sliding engagement with a guide groove 45 formed in the chassis 1.

The tape recorder in which the tape cassette loading apparatus described above is incorporated operates in the following manner. Referring to FIG. 1, the tape recorder is shown in its stopping condition. In the condition shown, the controlling member 22 is positioned at its home position as seen in FIGS. 1, 3 and 7. The cam pin 34 of the head mounting plate 7 is positioned at a substantially mid portion of the first straight portion 33a of the first cam 33 of the controlling member 22 and the head mounting plate 7 is positioned at its home position. The engaging projections 38 and 39 of the cassette holder 39 are positioned at the upper side horizontal portions 36a and 37a of the front and rear side cam slots 36 and 37 of the second cam 35 of the controlling member 22, respectively. Consequently, the support member 11 and the cassette holder 13 are held at their individual upwardly moved positions. Further, the engaging pin 23 of the controlling member 22 remains in engagement with the engaging recess 21 of the pivotal lever 16.

When a tape cassette 9 is inserted in the direction of the arrow mark C into the cassette holder 13 through the cassette insertion opening 13a in such stopping condition of the tape recorder as described just above, the end portion 15a of the slider 15 is engaged with the reel 9a of the tape cassette 9. When the tape cassette 9 is further inserted a little into the cassette holder 13 after then, the slider 15 is moved a little in the direction of the arrow mark C together with the tape cassette 9. During such movement, pivotal lever 16 is pivoted a little in the counterclockwise direction in FIGS. 1 and 3 by way of the connecting pin 17. The controlling member 22 is thus moved a little forwardly in the direction of the arrow mark D by the pivotal lever 16 since the engaging pin 23 of the controlling member 22 is in engagement with the engaging recess 21 of the pivotal lever 16. The forward movement of the controlling member 22 rotates the gear 30, held in meshing engagement with the other rack 25, a little in the counterclockwise direction in FIG. 3. Consequently, a detection signal is delivered from the position detector 29, and a controlling signal is delivered, in response to the detection signal, from the motor controller 32 so that the loading motor 27 is rotated in one direction. Thus force of the loading motor 27 is transmitted to the rack 24 of the controlling member 22 by way of the reduction gear train 26. Consequently, the controlling member 22 is thereafter moved forwardly in the direction of the arrow mark D by the force of the loading motor 27.

Upon such forward movement of the controlling member 27, the pivotal lever 16, which remains in engagement with the engaging pin 23 by way of the engaging recess 21, is pivoted in the counterclockwise direction in FIG. 3. By such pivotal motion of the pivotal lever 16, the tape cassette 9 is drawn in the direction of the arrow mark C into the cassette holder 13 by way of the connecting pin 17 and the slider 15.

When the controlling member 22 is moved forwardly in the direction of the arrow mark D after the tape cassette 9 is drawn in to a predetermined position in the cassette holder 13 in this manner so that such a condition as shown in FIG. 8 is reached, the engaging projections 38 and 39 of the cassette holder 13 are moved away from the upper side horizontal portions 36a and 37a of the front and rear side cam slots 36 and 37 and introduced into the lower side horizontal portions 36b and 37b by way of the inclined portions 36c and 37c, respectively. Thereupon, the support member 11 is pivoted downwardly around the pivot 12 and the cassette holder 13 is moved down while maintaining its horizontal position until the reels 9a and 9b of the tape cassette 9 are engaged with the reel spindles 3a and 3b, respectively, so that such a condition as shown in FIG. 9 is reached. In this condition, the engaging lug 42 of the pivotal lever 16 is engaged with the outer face of the side wall 1a of the chassis 1 to prevent returning pivotal motion of the pivotal lever 16.

When the controlling member 22 is further moved forwardly in the direction of the arrow mark C after then, the engaging pin 23 of the controlling member 22 is disengaged from the engaging recess 21 of the pivotal lever 16. Consequently, the pivotal lever 16 is stopped at the position. Meanwhile, the cam pin 34 of the head mounting plate 7 is moved away from the first straight portion $33_1$ of the first cam 33 and introduced into the second straight portion $33_2$ by way of the first inclined portion $33_4$. Thereupon, the head mounting plate 7 is moved forwardly in the direction of the arrow mark A until it comes to its fast feed or rewind position shown in FIG. 5.

When the controlling member 22 is further moved forwardly in the direction of the arrow mark C after then, the cam pin 34 of the head mounting plate 7 is moved away from the second straight portion $33_2$ of the first cam 33 and introduced into the third straight portion $33_3$ by way of the second inclined portion $33_5$. Consequently, the head mounting plate 7 is further moved forwardly in the direction of the arrow mark A until it comes to its play position shown in FIG. 4.

When the head mounting plate 7 comes to the play position in this manner, the position is detected by the position detector 29. Such detection signal is delivered to the motor controller 32, which thus delivers a controlling signal in response to the detection signal thus received. Rotation of the loading motor 27 is thus stopped in response to the controlling signal, and consequently, also the controlling member 22 is stopped.

In the condition thus reached, the inclined face 40a of the pressing projection 40 of the controlling member 22 presses against the protrusion 41 of the support member 11, and consequently, the cassette holder 13 is pressed downwardly by the support member 11.

Accordingly, while one side of the support member 11 is pressed by the pressing projection 40, the pressing force acting on the one side of the support member 11 is dispersed to the opposite sides of the cassette holder 13 by the support member 11, and consequently, the cassette holder 13 is pressed down over the entire face thereof in a stabilized condition by uniform force.

When the head mounting plate 7 is at its play position, the magnetic head 8 contacts with the tape 10 in the tape cassette 9 while the pinch roller 5a is pressed against the corresponding capstan 4a with the tape 10 interposed therebetween. Consequently, the tape 10 is fed at a fixed speed from the reel spindle 3b side to the other reel spindle 3a side to effect a playing (recording or reproducing) operation (condition shown in FIG. 2).

If the operating switch 31 is manually operated in order to change over the mode of the tape recorder to a stopping mode when the playing operation comes to an end, then such operation signal is inputted to the motor controller 32. In response to the input signal, the motor controller 32 delivers a controlling signal so that the loading motor 27 is now rotated in the opposite direction.

Consequently, the various movable elements operate reversely to those described above so that an electing operation is effected to eject the tape cassette 9 from the cassette holder 13 until the initial stopping condition shown in FIG. 1 is restored.

Figure 5:
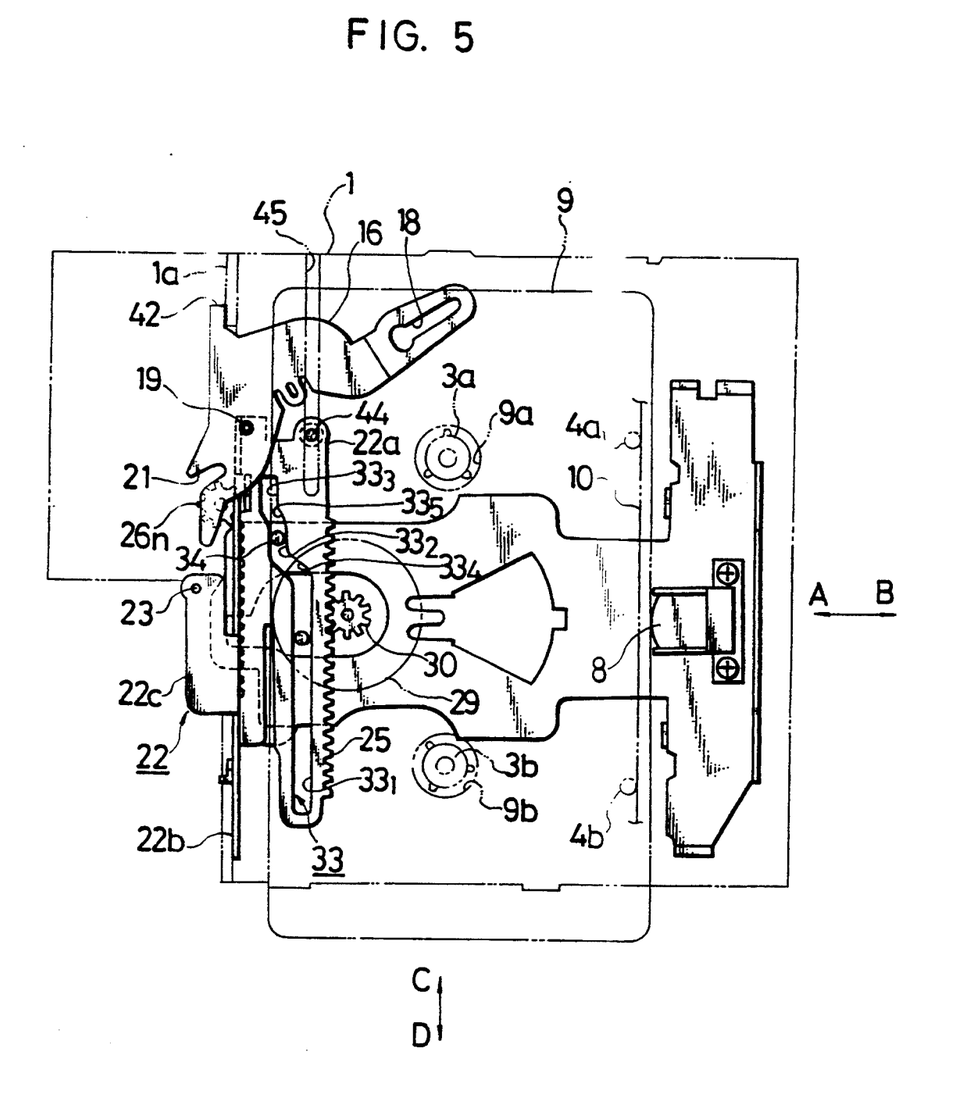
FIG. 5 is similar to FIG. 3 buy shows the tape recorder in a fast forward or rewind mode.

On the other hand, if the operating switch 31 is changed over to its fast feed or rewind mode position, then the cam pin 34 of the head mounting plate 7 is engaged with the second straight portion $33_2$ of the first cam 33 of the controlling member 22 so that the head mounting plate 7 is positioned to its fast feed or rewind position. In this state, the magnetic head 8 is spaced by a small distance from the tape 10 and also both of the pinch rollers 5a and 5b are spaced by a small distance from the capstans 4a and 4b, respectively, while the tape 10 is fed at a high speed in one direction from the reel spindle 3b to the other reel spindle 3a or in the opposite direction, thereby effecting a fast feeding or rewinding operation as shown in FIG. 5.

Figure 14:
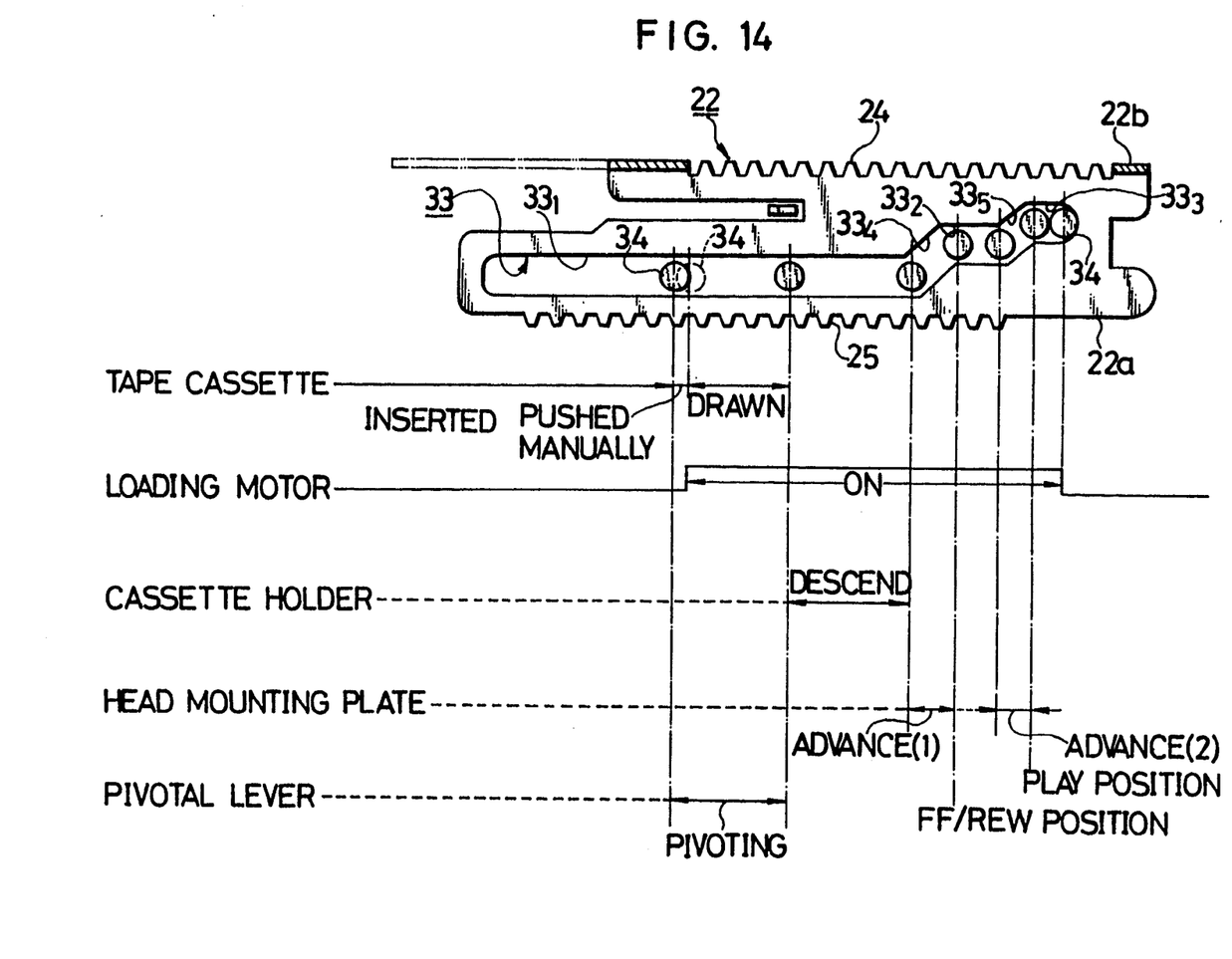
FIG. 14 is a diagrammatic view illustrating functions of various elements of the tape cassette loading apparatus, said functions corresponding to various positions of the controlling member.

As shown in FIGS. 13 and 14, the pivotal lever 16 is pivoted at an initial stage when the tape cassette 9 is inserted into the cassette holder 13, and the controlling member 22 is moved a little forwardly by the pivotal lever. The movement of the controlling member 22 is detected by the position detector 29, and loading motor 27 is controlled in response to a detection signal from the position detector 29. The controlling member 22 is driven to move forwardly and backwardly by power of the loading motor 27, and a changing-over operation between loading and unloading of the tape cassette 9 and a mode-dependent position changing-over operation of the head mounting plate 7 are performed by the forward and backward movement of the controlling member 22. The tape cassette loading apparatus according to this invention, therefore, permit smooth movements of various components at suitable timings with a simple construction.

It is to be noted that the present invention is not limited to the specific embodiment described above. For example, while the pivotal lever 16 is biased by means of the spring 20 in the embodiment described above, the spring 20 may be omitted. Further, while the loading motor 27 is provided independently of the tape feeding motor 2, alternatively a suitable rotation transmitting changing over mechanism may be incorporated such that a tape feeding operation and a tape cassette loading operation may be performed by means of a single motor.

Further, to which position the controlling member 22 should be moved upon loading of a tape cassette may be determined depending upon specifications of the apparatus and may be suitably changed by construction of the motor controller 32. Further, many changes and modifications can be made to the specific embodiment described above without departing from the spirit and scope of the invention as set forth herein.

What is claimed is:

1. A loading/ejecting and operation mode setting mechanism for a tape recorder, comprising:

a single controlling member reciprocally mounted on a chassis when driven by a motor, said controlling member having a first cam portion, a second cam portion and an engaging pin, said first and second cam portions being formed of positive cam slots;

a position detector for detecting a position of said controlling member relative to said chassis;

means for controlling energization of said motor on the basis of an output from said position detector;

a head mounting plate having a cam pin engageable with said first cam portion and movable horizontally by a positive cam action of said first cam portion upon movement of said controlling member, whereby said head mounting plate is positioned and the position of a magnetic head mounted on said head mounting plate is moved;

a cassette holder having an engaging projection provided in engagement with said second cam portion and by a positive cam action of said second cam portion as a result of movement of said controlling member, vertically movable between a lower, tape operating position and an upper, tape cassette receiving/ejecting position so that said cassette holder is selectively positioned at said tape-operating position or the receiving/ejecting position;

a pivotal lever having a positive cam selectively engageable with said engaging pin and by a positive cam action of said second cam portion as a result of movement of said controlling member, pressed by said engaging pin to pivot between a loading position and an ejecting position, whereby the tape cassette is received in or ejected from said cassette holder, said pivotal lever, when moved from said ejecting position pressing said engaging pin by said positive cam to move said controlling member, thereby actuating said motor control means, said positive cam being engageable with said engaging pin when said cassette holder is located at said tape cassette receiving/ejecting position but being apart from said engaging pin when said cassette holder is located at said tape-operating position; and an engaging lug provided on the pivotal lever and selectively engageable with said chassis to hold said pivotal lever at said loading position, said engaging lug being brought into engagement with said chassis when said cassette holder has moved away from said tape cassette receiving/ejecting position and said engaging pin is located apart from said positive cam.

2. A loading/ejecting and operation mode setting mechanism according to claim 1, wherein said controlling member is provided with a pressing projection for pressing said cassette holder, which has been lowered to said tape-operating position, toward the tape-operating position.

3. A loading/ejecting and operation mode setting mechanism according to claim 1, wherein said position detector comprises a rotary encoder having a gear which is mounted on a rotary shaft and is rotatable thereabout in meshing engagement with a rack arranged on said controlling member, whereby the position of the controlling member linearly and reciprocally moving on said chassis is detected by said rotary encoder.

* * * * *